United States Patent
Kim et al.

(10) Patent No.: US 10,111,107 B2
(45) Date of Patent: Oct. 23, 2018

(54) DOWNLINK DIGITAL SIGNAL SUMMATION IN DISTRIBUTED ANTENNA SYSTEM

(71) Applicant: SOLiD, INC., Seongnam-si, Gyeonggi-do (KR)

(72) Inventors: Hyoungho Kim, Seoul (KR); Doyoon Kim, Bucheon-si (KR)

(73) Assignee: SOLiD, INC., Seongnam-si (KR)

( * ) Notice: Subject to any disclaimer, the term of this patent is extended or adjusted under 35 U.S.C. 154(b) by 20 days.

(21) Appl. No.: 15/084,843

(22) Filed: Mar. 30, 2016

(65) Prior Publication Data

US 2016/0212630 A1 Jul. 21, 2016

Related U.S. Application Data

(63) Continuation of application No. PCT/KR2015/014449, filed on Dec. 29, 2015.

(30) Foreign Application Priority Data

Dec. 30, 2014 (KR) .......................... 10-2014-0194370

(51) Int. Cl.
*H04W 88/08* (2009.01)
*H04W 16/24* (2009.01)
*H04B 7/024* (2017.01)

(52) U.S. Cl.
CPC ............ *H04W 16/24* (2013.01); *H04B 7/024* (2013.01); *H04W 88/085* (2013.01)

(58) Field of Classification Search
CPC ..... H04W 16/24; H04W 40/22; H04W 52/46; H04W 88/04; H04W 88/085; H04B 7/024

USPC ........................ 455/7–25, 446; 370/315–327
See application file for complete search history.

(56) References Cited

U.S. PATENT DOCUMENTS

| 8,588,614 | B2* | 11/2013 | Larsen | H04B 10/25754 398/115 |
| 9,356,697 | B2* | 5/2016 | Notargiacomo | ......................... H04B 10/25753 |
| 2008/0181282 | A1* | 7/2008 | Wala | ........................ H04B 1/18 375/130 |
| 2009/0316608 | A1* | 12/2009 | Singh | ................. H04B 7/15507 370/280 |

(Continued)

OTHER PUBLICATIONS

International Search Report issued in PCT/KR2015/014449 dated Dec. 29, 2015.
Written Opinion issued in KR/2015/014449 dated May 3, 2016.

*Primary Examiner* — Marcus Hammonds
(74) *Attorney, Agent, or Firm* — Sughrue Mion, PLLC

(57) ABSTRACT

There is provided a distributed antenna system includes a plurality of head-end units configured to receive mobile communication signals from at least one base station, a hub unit connected to each of the plurality of head-end units through a first transport medium, the hub unit distributing the mobile communication signals respectively received from the plurality of head-end units to a plurality of remote units connected thereto through a second transport medium, and the plurality of remote units remotely disposed to transmit the mobile communication signals to a terminal in a service coverage, wherein the hub unit includes a signal summer configured to digitally sum sub-band signals in a same mobile communication service band based on the mobile communication signals.

6 Claims, 4 Drawing Sheets

(56) References Cited

U.S. PATENT DOCUMENTS

| | | | |
|---|---|---|---|
| 2009/0316609 A1* | 12/2009 | Singh | H04B 7/2609 |
| | | | 370/280 |
| 2010/0278530 A1* | 11/2010 | Kummetz | H04W 88/085 |
| | | | 398/41 |
| 2012/0076500 A1* | 3/2012 | Notargiacomo | H04B 10/25758 |
| | | | 398/116 |
| 2013/0095870 A1* | 4/2013 | Phillips | H04W 52/146 |
| | | | 455/501 |
| 2013/0114761 A1 | 5/2013 | Azadet et al. | |
| 2014/0016583 A1* | 1/2014 | Smith | H04J 14/0227 |
| | | | 370/329 |
| 2014/0024402 A1* | 1/2014 | Singh | H04B 17/23 |
| | | | 455/501 |
| 2014/0050483 A1* | 2/2014 | Berlin | H04B 7/2606 |
| | | | 398/115 |
| 2014/0064730 A1* | 3/2014 | Ko | H04B 10/25754 |
| | | | 398/67 |
| 2014/0119281 A1 | 5/2014 | Kummetz et al. | |
| 2014/0233435 A1* | 8/2014 | Ko | H04W 88/085 |
| | | | 370/277 |
| 2015/0373722 A1* | 12/2015 | Lange | H04B 7/026 |
| | | | 370/315 |

\* cited by examiner

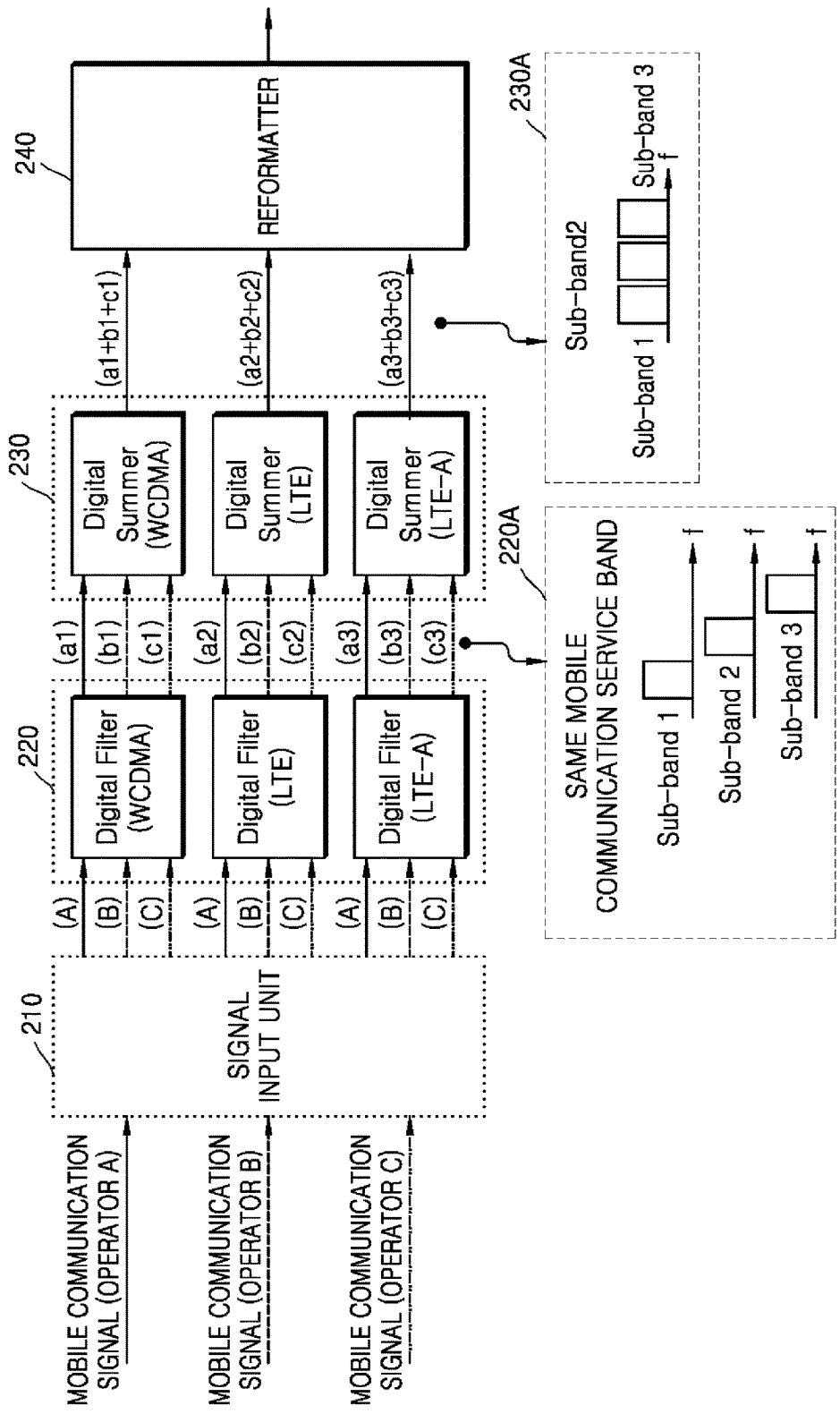

DOWNLINK DIGITAL SIGNAL SUMMATION IN DISTRIBUTED ANTENNA SYSTEM

CROSS REFERENCE TO RELATED APPLICATIONS

This application is a Continuation of PCT International Application No. PCT/KR2015/014449, filed Dec. 29, 2015, and claims priority from Korean Patent Application No. 10-2014-0194370, filed Dec. 30, 2014, the contents of which are incorporated herein by reference in their entireties.

BACKGROUND

1. Field

The inventive concept relates to a distributed antenna system (DAS), and more particularly, to a downlink digital signal summation in a DAS.

2. Description of Related Art

A distributed antenna system (DAS) may have various topologies in consideration of particularity of its installation areas and application fields (e.g., in-building, subway, hospital, stadium, etc.). Moreover, in the DAS, a hub unit (HUB) may be introduced when it is difficult to install remote units (RUs) as many as a number required to be installed due to a limited number of branches of a main unit (MU).

According to a topology form, a plurality of MUs may be connected to a single HUB, and a plurality of RU may be connected in a star or cascade structure through the HUB. In this case, there is required a method in which, when different sub-band signals in the same service band are transmitted from each MU to the HUB, signals can be efficiently transmitted to the RUs posterior to the HUB.

SUMMARY

An embodiment of the inventive concept is directed to a downlink digital signal summation applicable to a distributed antenna system.

According to an aspect of the inventive concept, there is provided a distributed antenna system, comprising: a plurality of head-end units configured to receive mobile communication signals from at least one base station; a hub unit connected to each of the plurality of head-end units through a first transport medium, the hub unit distributing the mobile communication signals respectively received from the plurality of head-end units to a plurality of remote units connected thereto through a second transport medium; and the plurality of remote units remotely disposed to transmit the mobile communication signals to a terminal in a service coverage, wherein the hub unit includes a signal summer configured to digitally sum sub-band signals in a same mobile communication service band based on the mobile communication signals.

According to an exemplary embodiment, wherein each of the sub-band signals may have a different frequency band each other in a same mobile communication service band.

According to an exemplary embodiment, wherein the plurality of head-end units may perform digital signal conversion on the mobile communication signals, and transmit the digital-converted mobile communication signals to the hub unit.

According to an exemplary embodiment, wherein the hub unit may further include a band extractor configured to extract the sub-band signals in the same mobile communication service band from each of the mobile communication signals.

According to an exemplary embodiment, wherein the hub unit may further include a reformatter configured to reformat the sub-band signals digitally summed by the signal summer to be suitable for a transmission standard defined in the distributed antenna system.

According to an exemplary embodiment, wherein the plurality of head-end units may receive the mobile communication signals of different mobile communication operators.

According to another aspect of the inventive concept, there is provided a first node unit for receiving a plurality of mobile communication signals from a plurality of second node units and distributing the mobile communication signals to a plurality of third node units connected thereto, the first node unit comprising: a signal summer configured to digitally sum sub-band signals in a same mobile communication service band based on the plurality of second node units.

According to an exemplary embodiment, wherein each of the sub-band signals may have a different frequency band each other in a same mobile communication service band.

According to an exemplary embodiment, wherein the first node unit may further include a band extractor configured to extract the sub-band signals in the same mobile communication service band from each of the mobile communication signals.

According to an exemplary embodiment, wherein the first node unit, the second node unit and the third node unit may form nodes in a distributed antenna system, and wherein the first node unit may further include a reformatter configured to reformat the sub-band signals digitally summed by the signal summer to be suitable for a transmission standard defined in the distributed antenna system.

According to embodiments of the inventive concept, a digital downlink signal summation is performed on different sub-band signals in the same service band in the distributed antenna system, thereby improving the efficiency of digital transmission.

BRIEF DESCRIPTION OF THE FIGURES

Exemplary embodiments of the inventive concept will be more clearly understood from the following detailed description taken in conjunction with the accompanying drawings in which:

FIG. 4 is a block diagram illustrating components for performing the downlink digital signal summation as a digital part of a hub unit according to the embodiment of the inventive concept.

DETAILED DESCRIPTION OF EXEMPLARY EMBODIMENTS

Figure 1:
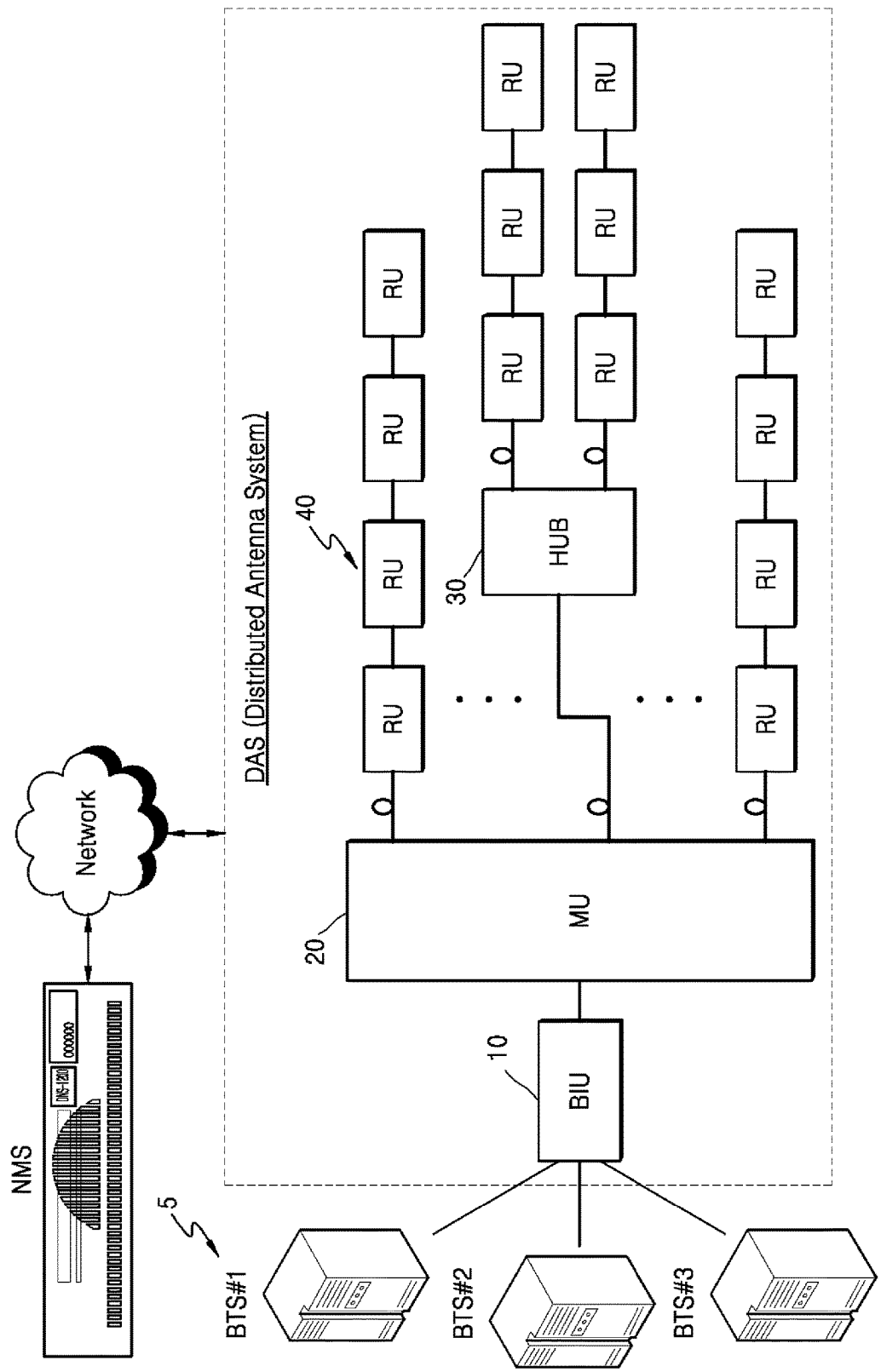
FIG. 1 is a diagram illustrating an example of a topology of a distributed antenna system (DAS) as one form of a signal distributed transmission system to which the inventive concept is applicable.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

Hereinafter, a distributed antenna system (DAS) will be mainly described as an application example to which embodiments of the inventive concept are applicable. However, the embodiments of the inventive concept are identically or similarly applicable to other signal distributed transmission systems such as a base transceiver station distributed antenna system, as well as the DAS.

FIG. 1 is a diagram illustrating an example of a topology of a DAS as one form of a signal distributed transmission system to which the inventive concept is applicable.

Referring to FIG. 1, the DAS may include a base station interface unit (BIU) 10 and a main unit (MU) 20, which constitute a head-end node of the DAS, a hub unit (HUB) 30 serving as an extension node, and a plurality of remote units (RUs) 40 respectively disposed at remote service positions. The DAS may be implemented as an analog DAS or a digital DAS. When necessary, the DAS may be implemented as a hybrid of the analog DAS and the digital DAS (e.g., to perform analog processing on some nodes and digital processing on the other nodes).

However, FIG. 1 illustrates an example of the topology of the DAS, and the DAS may have various topologies in consideration of particularity of its installation areas and application fields (e.g., in-building, subway, hospital, stadium, etc.). In view of the above, the number of the BIU 10, the MU 20, the HUB 30, and the RUs 40 and connection relations between upper and lower nodes among the BIU 10, the MU 20, the HUB 30, and the RUs 40 may be different from those of FIG. 1. In the DAS, the HUB 30 may be used when the number of branches to be branched in a star structure from the MU 20 is limited as compared with the number of RUs 40 required to be installed. Therefore, the HUB 30 may be omitted when only the single MU 20 sufficiently covers the number of RUs 40 required to be installed, when a plurality of MUs 20 are installed, or the like.

Hereinafter, nodes in the DAS applicable to the inventive concept and their functions will be sequentially described based on the topology of FIG. 1.

The BIU 10 serves as an interface between a base station transceiver system (BTS) 5 and the MU 20. Although a case where three BTSs BTS#1 to BTS#3 are connected to the single BIU 10 is illustrated in FIG. 1, the BIU 10 may be separately provided for each provider, each frequency band, or each sector.

In general, a base station signal transmitted from the BTS 5 is a radio frequency (RF) signal of high power. Hence, the BIU 10 converts the RF signal of high power into a signal with power suitable to be processed in the MU 20 and transmits the converted signal to the MU 20. According to an embodiment, the BIU 10, as shown in FIG. 1, may receive base station signals for each frequency band (or each provider or each sector), combine the received signals, and then transmit the combined signal to the MU 20.

When the BIU 10 converts RF signals of high power, transmitted from the BTS 5, into mobile communication signals of low power, combines the RF signals, and then transmits the combined RF signal to the MU 20, the MU 20 may distribute the combined and transmitted RF signal for each branch. In this case, when the DAS is implemented as the digital DAS, the BIU 10 may be separated into a unit for converting RF signals of high power, transmitted from the BTS 5, into RF signals of low power, and a unit for converting RF signals of low power into intermediate frequency (IF) signals, performing digital signal processing on the converted IF signals, and then combining the processed digital signals. Alternatively, when the BIU 10 performs only the function of converting the RF signals of high power, transmitted from the BTS 5, into the RF signals of low power, the MU 20 may combine the transmitted RF signals and distribute the combined RF signal for each branch.

As described above, the combined RF signal distributed from the MU 20 may be transmitted to the RUs 40 through the HUB 30 or directly transmitted to the RUs 40, for each branch (see Branch #1, . . . , Branch #k, . . . , Branch #N of FIG. 1). Each RU 40 may separate the transmitted combined RF signal for each frequency band and perform signal processing (analog signal processing in the analog DAS and digital signal processing in the digital DAS). Accordingly, each RU 40 can transmit RF signals to user terminals in its own service coverage through a service antenna. Specific components and functions of the RU 40 will be described in detail below with reference to FIG. 4.

In FIG. 1, it is illustrated that the BTS 5 and the BIU 10 are connected through an RF cable, the BIU 10 and the MU 20 are connected through an RF cable, and all nodes from the MU 20 to lower nodes thereof are connected through optical cables. However, a signal transport medium between nodes may be variously modified. As an example, the BIU 10 and the MU 20 may be connected through an RF cable, but may be connected through an optical cable or a digital interface. As another example, the MU 20 and HUB 30 may be connected through an optical cable, the MU 20 and the RU 40 directly connected thereto may be connected through an optical cable, and the cascade-connected RUs 40 may be connected through an RF cable, a twist cable, a UTP cable, etc. As still another example, the MU 20 and the RU 40 directly connected thereto may also be connected through an RF cable, a twist cable, a UTP cable, etc.

Hereinafter, this will be described based on FIG. 1. Therefore, in this embodiment, each of the MU 20, the HUB 30, and the RUs 40 may include an optical transceiver module for electrical-to-optical (E/O) conversion/optical-to-electrical (O/E) conversion. When node units are connected through a single optical cable, each of the MU 20, the HUB 30, and the RUs 40 may include a wavelength division multiplexing (WDM) element.

The DAS may be connected to an external monitoring device, e.g., a network management server or system (NMS)

50. Accordingly, a manager can remotely monitor states and problems of the nodes in the DAS through the NMS 50, and can remotely control operations of the nodes in the DAS through the NMS 50.

Figure 2:
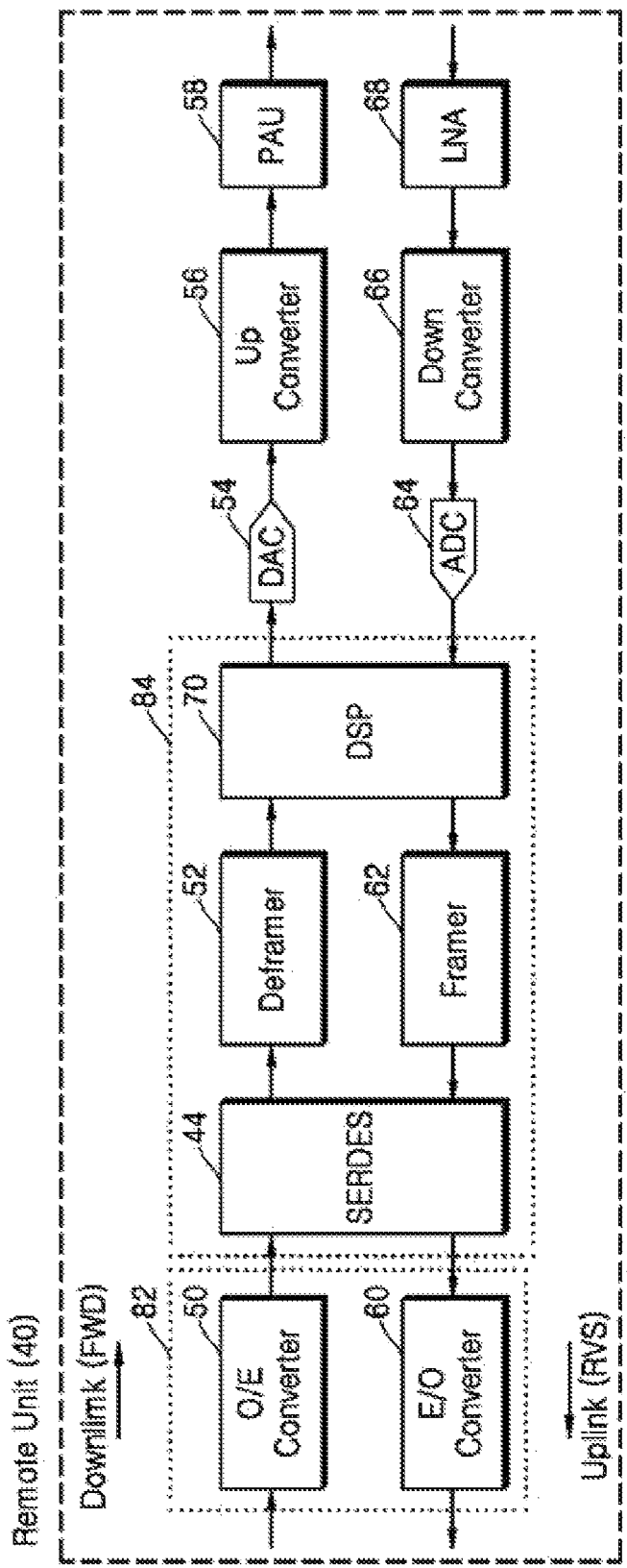
FIG. 2 is a block diagram illustrating an embodiment of a remote unit in the DAS to which the inventive concept is applicable.

FIG. 2 is a block diagram illustrating an embodiment of the RU in the DAS to which the inventive concept is applicable.

Here, the block diagram of FIG. 2 illustrates an embodiment of the RU 40 in the digital DAS in which nodes are connected through an optical cable. In addition, the block diagram of FIG. 2 illustrates only components related to a function of providing service signals to terminals in service coverage through a forward path and processing terminal signals received from the terminals in the service coverage through a reverse path.

Referring to FIG. 2, with respect to a downlink signal transmission path (i.e., a forward path), the RU 40 includes an optical-to-electrical (O/E) converter 50, a serializer/deserializer (SERDES) 44, a deframer 52, a digital signal processor (DSP) 70, a digital-to-analog converter (DAC) 54, an up converter 56, and a power amplification unit (PAU) 58.

In the forward path, an optical relay signal digital-transmitted through an optical cable may be converted into an electrical signal (serial digital signal) by the O/E converter 50. The serial digital signal may be converted into a parallel digital signal by the SERDES 44. The parallel digital signal may be deformatted by the deframer 52. The DSP 70 performs functions including digital signal processing, digital filtering, gain control, digital multiplexing, etc. on relay signals for each frequency band. The digital signal passing through the DSP 70 is converted into an analog signal through the DAC 54 posterior to a digital part 84, based on the signal transmission path. In this case, when the converted analog signal is an IF signal or a baseband signal, the analog signal may be frequency up-converted into an analog signal in the original RF band through the up converter 56. The converted analog signal (i.e., the RF signal) in the original RF band is amplified through the PAU 58 to be transmitted through a service antenna (not shown).

With respect to an uplink signal transmission path (i.e., a reverse path), the RU 40 includes a low noise amplifier (LNA) 68, a down converter 66, an analog-to-digital converter ADC 64, the DSP 70, a framer 62, the SERDES 44, and an electrical-to-optical (E/O) converter 60.

In the reverse path, an RF signal (i.e., a terminal signal) received through the service antenna (not shown) from a user terminal (not shown) in a service coverage may be low-noise amplified by the LNA 68. The low-noise amplified signal may be frequency down-converted into an IF signal by the down converter 66. The converted IF signal may be converted into a digital signal by the ADC 64 to be transmitted to the DSP 70. The digital signal passing through the DSP 70 is formatted in a format suitable for digital transmission through the framer 62. The formatted digital signal is converted into a serial digital signal by the SERDES 44. The serial digital signal is converted into an optical digital signal by the E/O converter 60 to be transmitted to an upper node through an optical cable.

Although not clearly shown in FIG. 2, in the state in which the RUs 40 are cascade-connected to each other as illustrated in FIG. 1, the following method may be used when a relay signal transmitted from an upper node is transmitted to a lower adjacent RU cascade-connected to the upper node. For example, when an optical relay signal digital-transmitted from an upper node is transmitted to a lower adjacent RU cascade-connected to the upper node, the optical relay signal digital-transmitted from the upper node may be transmitted to the adjacent RU in an order of the O/E converter 50→the SERDES 44→the deframer 52→the framer 62→the SERDES 44→the E/O converter 60.

In FIG. 2, the SERDES 44, the deframer 52, the framer 62, and the DSP 70 may be implemented as a field programmable gate array (FPGA). In FIG. 2, it is illustrated that the SERDES 44 and the DSP 70 are commonly used in the downlink and uplink signal transmission paths. However, the SERDES 44 and the DSP 70 may be separately provided for each path. In FIG. 2, it is illustrated that the O/E converter 50 and the E/O converter 60 are provided separately from each other. However, the O/E converter 50 and the E/O converter 60 may be implemented as a single optical transceiver module (e.g., a single small form factor pluggable (SFP) (see reference numeral 82 of FIG. 2)).

In the above, one form of the topology of the DAS and an embodiment of the RU have been described with reference to FIGS. 1 and 2. Particularly, the RU in the digital DAS in which digital signals are transmitted through a transport medium has been mainly described in FIG. 2. However, it will be apparent that the inventive concept may be applied to various application examples.

Figure 3:
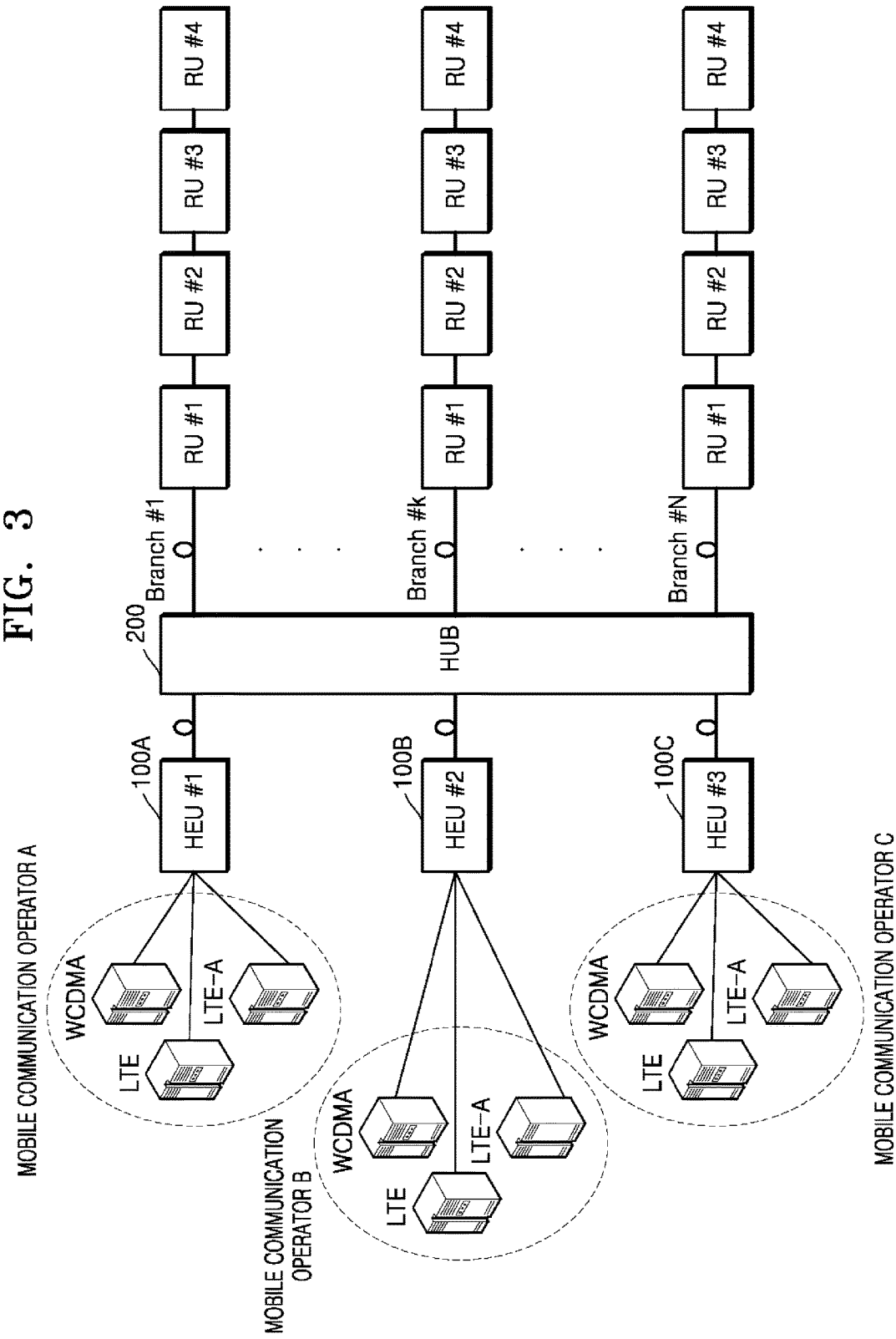
FIG. 3 is a diagram illustrating a topology form of the DAS to which a downlink digital signal summation is applied according to an embodiment of the inventive concept.

FIG. 3 is a diagram illustrating a topology form of the DAS to which a downlink digital signal summation is applied according to an embodiment of the inventive concept.

The downlink digital signal summation according to the embodiment of the inventive concept may be applied to a topology form of the DAS as shown in FIG. 3, which includes a plurality of HEUs 100A, 100B, and 100C, a single HUB 200, and a plurality of RUs connected in a star structure or/and a cascade structure to the single HUB 200.

In addition, it will be apparent that the downlink digital signal summation according to the embodiment of the inventive concept may be applied to various types of signal distributed systems each including a plurality of upper nodes constituting an upper stage based on a signal transmission direction, and a middle node receiving a plurality of mobile communication signals from the plurality of upper nodes, the middle node distributing the mobile communication signals to a plurality of lower nodes branch-connected thereto. Hereinafter, for convenience of illustration, the embodiment of the inventive concept will be described in detail based on FIG. 3.

Referring to FIG. 3, each of the HEUs 100A, 100B, and 100C receives mobile communication signals from a plurality of BTSs through transport mediums. In this case, each of the HEUs 100A, 100B, and 100C may perform digital signal conversion on the plurality of mobile communication signals from the plurality of BTSs and transmit the digital-converted mobile communication signals to the HUB 200.

In this embodiment, it is assumed that each of the HEUs 100A, 100B, and 100C receives mobile communication signals of different mobile communication operators. Although it is assumed in FIG. 3 that one HEU and one mobile communication operator are matched one by one, the inventive concept is not limited thereto. That is, base stations covered by each HEU may not be base stations of different operators. In this case, the base station may be a base station unit concentrated on a remote place such as a BTS hotel. Hereinafter, for convenience of illustration, a case where each HEU receives signals for each mobile communication service band from base station units of different operators will be mainly described.

In the topology illustrated in FIG. 3, when different sub-band signals in the same mobile communication service band (e.g., an LTE serve band using a band of 800 MHz) are transmitted to the HUB 200 from different HEU 100A, 100B, and 100C, the HUB 200 may perform the downlink digital signal summing method according to the embodiment of the inventive concept. Hereinafter, this will be described with reference to FIG. 4.

FIG. 4 is a block diagram illustrating components for performing the downlink digital signal summation as a digital part of a hub unit according to the embodiment of the inventive concept.

Referring to FIG. 4, in order to perform the downlink digital signal summation, the digital part of the HUB 200 may include a signal input unit 210, a band extractor 220, a signal summer 230, and a reformatter 240.

The signal input unit 210 allows mobile communication signals transmitted from each of the HEUs 100A, 100B, and 100C to be input to the band extractor 220. In this case, the signal input unit 210 may receive mobile communication signals input from each of the HEUs 100A, 100B, and 100C and then deframed.

For example, it is assumed that mobile communication signals (see reference numeral (A) of FIG. 4) of a mobile communication operator A are input to the HUB 200 from the HEU of reference numeral 100A, mobile communication signals (see reference numeral (B) of FIG. 4) of a mobile communication operator B are input to the HUB 200 from the HEU of reference numeral 100B, and mobile communication signals (see reference numeral (C) of FIG. 4) of a mobile communication operator C are input to the HUB 200 from the HEU of reference numeral 100C. Here, the signals input to the HUB for each mobile communication operator may include mobile communication signals in the WCDMA band, the LTE band, and the LTE-A band. In this case, the mobile communication signals for each mobile communication operator may be input, through the signal input unit 210, to a digital filter for each service band (see a digital filter for separating the WCDMA band, a digital filter for separating the LTE band, and a digital filter for separating the LTE-A band in FIG. 4).

The band extractor 220 is provided with the digital filter for each service band, to separate only a signal corresponding to the service band. Referring to FIG. 4, the mobile communication signals (A) of the mobile communication operator A, the mobile communication signals (B) of the mobile communication operator B, and the mobile communication signals (C) of the mobile communication operator C are band-separated by the digital filter for each service band. Here, reference numeral (a1) designates a signal in the WCDMA band among the mobile communication signals (A) of the mobile communication operator A, reference numeral (b1) designates a signal in the WCDMA band among the mobile communication signals (B) of the mobile communication operator B, and reference numeral (c1) designates a signal in the WCDMA band among the mobile communication signals (C) of the mobile communication operator C. In the same manner, reference numeral (a2), (b2), or (c2) designate a signal in the LTE band among the mobile communication signals of each mobile communication operator, and reference numeral (a3), (b3), or (c3) designate a signal in the LTE-A band among the mobile communication signals of each mobile communication operator.

In FIG. 4, the case where the band extractor 220 is implemented with digital filters for each band is illustrated as an example. However, it will be apparent that various methods may be applied in addition to the band extraction method.

As described above, if the signals for each mobile communication operator pass through the band extractor 220, sub-band signals (see Sub-band 1, Sub-band 2, and Sub-band 3) in the same mobile communication service band may be extracted as shown in reference numeral 220A of FIG. 4. Here, the Sub-band 1 conceptually illustrates a frequency band used by the mobile communication operator A in a process of providing a specific mobile communication service, the Sub-band 2 conceptually illustrates a frequency band used by the mobile communication operator B in a process of providing a specific mobile communication service, and the Sub-band 3 conceptually illustrates a frequency band used by the mobile communication operator C in a process of providing a specific mobile communication service.

The sub-band signals extracted for each of the same mobile communication service bands through the band extractor 220 as described above are input to the signal summer 230. In the embodiment of the inventive concept, the signal summer 230 digitally sums the different sub-band signals in the same mobile communication service band, input through the band extractor 220. If the sub-band signals pass through the signal summer 230, the summing of the sub-band signal in the same mobile communication service band is performed as shown in reference numeral 230A of FIG. 4, and a digital frame signal suitable for a transmission standard defined in the DAS is generated based on the summed signal through the reformatter 240. The digital frame signal passing through the reformatter 240 may be transmitted each RU branch-connected to the HUB 200 via a framer, an SERDES, and an E/O converter.

As described above, according to the inventive concept, digital downlink signal summing is performed on sub-band signals in the same service band, transmitted from a plurality of operators, in the DAS, thereby improving the efficiency of digital transmission.

Although the inventive concept has been described in connection with the exemplary embodiments, the inventive concept is not limited thereto but defined by the appended claims. Accordingly, it will be understood by those skilled in the art that various modifications and changes can be made thereto without departing from the spirit and scope of the inventive concept defined by the appended claims.

What is claimed is:

1. A distributed antenna system comprising:
    a plurality of head-end units configured to receive mobile communication signals from at least one base station, wherein each of the mobile communication signals includes a plurality of sub-band signals respectively corresponding to a plurality of mobile communication services;
    a hub unit connected to each of the plurality of head-end units through a first transport medium, the hub unit distributing the mobile communication signals respectively received from the plurality of head-end units to a plurality of remote units connected thereto through a second transport medium; and
    the plurality of remote units remotely disposed to transmit the mobile communication signals to a terminal in a service coverage,
    wherein the hub unit comprises:
        a band extractor configured to extract sub-band signals corresponding to a same mobile communication service, with respect to each of the plurality of mobile communication services, from the mobile communication signals;

a signal summer configured to digitally sum the extracted sub-band signals with respect to each of the plurality of mobile communication services; and a reformatter configured to generate a digital frame signal suitable for a transmission standard defined for signal transmission in the distributed antenna system based on the digitally summed signals.

2. The distributed antenna system of claim 1, wherein the sub-band signals corresponding to the same mobile communication service have different frequency bands.

3. The distributed antenna system of claim 1, wherein the plurality of head-end units perform digital signal conversion on the mobile communication signals, and transmit the digital-converted mobile communication signals to the hub unit.

4. The distributed antenna system of claim 1, wherein the plurality of mobile communication signals respectively correspond to different mobile communication operators.

5. A first node unit for receiving a plurality of mobile communication signals from a plurality of second node units and distributing the mobile communication signals to a plurality of third node units connected thereto, the first node unit comprising:

a band extractor configured to receive the plurality of mobile communication signals, each of which includes a plurality of sub-band signals respectively corresponding to a plurality of mobile communication services, extract sub-band signals corresponding to a same mobile communication service, with respect to each of a plurality of mobile communication services, from the mobile communication signals;

a signal summer configured to digitally sum the extracted sub-band signals with respect to each of the plurality of mobile communication services; and a reformatter configured to generate a digital frame signal suitable for a transmission standard defined for signal transmission in the distributed antenna system based on the digitally summed signals, wherein the first node unit, the second node units and the third node units form nodes in a distributed antenna system.

6. The first node unit of claim 5, wherein the sub-band signals corresponding to the same mobile communication service have different frequency bands.

* * * * *